United States Patent [19]

Taga et al.

[11] Patent Number: 4,777,848

[45] Date of Patent: Oct. 18, 1988

[54] METHOD AND DEVICE FOR CONTROLLING AUTOMATIC TRANSMISSION BETWEEN TWO SPEED CHANGE PATTERNS

[75] Inventors: Yutaka Taga; Yukio Hamano, both of Toyota, Japan

[73] Assignee: Toyota Jidosha Kabushiki Kaisha, Aichi, Japan

[21] Appl. No.: 911,363

[22] Filed: Sep. 25, 1986

[30] Foreign Application Priority Data

Oct. 1, 1985 [JP] Japan .................. 60-218310

[51] Int. Cl.⁴ ............................. B60K 41/06
[52] U.S. Cl. ......................... 74/866; 74/861
[58] Field of Search ............ 74/861, 866, 867, 856, 74/752 D

[56] References Cited

U.S. PATENT DOCUMENTS

| | | |
|---|---|---|
| 3,747,438 | 7/1973 | Toyoda et al. ............ 74/866 |
| 4,208,929 | 6/1980 | Heino et al. ............. 74/886 X |
| 4,252,148 | 2/1981 | Fochtman et al. ........ 74/866 X |
| 4,350,057 | 9/1982 | Kishi et al. ............. 74/866 |
| 4,576,065 | 3/1986 | Speranza et al. ......... 74/866 |
| 4,584,906 | 4/1986 | Nagaoka et al. .......... 74/866 |
| 4,602,696 | 7/1986 | Taga et al. ............. 74/866 X |
| 4,662,247 | 5/1987 | Sotoyama et al. ........ 74/866 |
| 4,669,335 | 6/1987 | Matsuoka et al. ........ 74/866 |
| 4,733,580 | 3/1988 | Kubo et al. ............. 74/866 |

FOREIGN PATENT DOCUMENTS

| | | |
|---|---|---|
| 56-24246 | 3/1981 | Japan . |
| 58-38186 | 8/1983 | Japan . |
| 6155451 | 3/1986 | Japan . |
| 61-167758 | 7/1986 | Japan . |

*Primary Examiner*—Leslie A. Braun
*Assistant Examiner*—David Novais
*Attorney, Agent, or Firm*—Parkhurst, Oliff & Berridge

[57] ABSTRACT

An automatic transmission for an automotive vehicle is selectively operable either in a first mode of providing a first, a second next to the first and a third next to the second speed stages, or in a second mode of providing the first and the third speed stages while skipping the second stage. The upshifting from the first speed stage to the second speed stage according to the first mode is effected at a lower vehicle road speed than the upshifting from the first speed stage to the third speed stage according to the second mode for the same load on the engine of the vehicle.

1 Claim, 5 Drawing Sheets

METHOD AND DEVICE FOR CONTROLLING AUTOMATIC TRANSMISSION BETWEEN TWO SPEED CHANGE PATTERNS

BACKGROUND OF THE INVENTION

The present invention relates to a method and a device for controlling an automatic transmission which can be switched between two speed change patterns according to the desire of the vehicle operator according to demands for vehicle power or smoothness or economy or the like, and more particularly relates to such a method and such a device for transmission control, in which the transitions between speed stages of said automatic transmission are appropriately adjusted in the two speed change patterns so as to provide most suitable transmission operation.

The present invention has been described in Japanese Patent Application Serial No. 60-218310 (1985), filed by an applicant the same as the entity assigned or owed duty of assignment of the present patent application; and the present patent application hereby incorporates into itself by reference to text of said Japanese Patent Application and the claim and the drawings thereof; a copy is appended to the present application.

Further, the present inventors wish hereby to attract the attention of the examining authorities to copending U.S. patent application No. 764,175 now U.S. Pat. No. 4,733,580, which may be considered to be material to the examination of the present patent application.

In Japanese Patent Applications Serial Nos. 59-176229 (1984) published under Japanese Publication Nos. 61-55451 (1986), and 60-7066 (1985) published under Japanese Publication No. 61-167758 (1986), which were made by an applicant the same as the entity assigned or owed duty of assignment of the present patent application, and which it is not intended hereby to admit as prior art to the present patent application except to the extent in any case required by applicable law, there is disclosed a novel type of automatic transmission, which can be operated according to two different patterns of shifting between its speed stages (hereinafter such patterns of speed stage shifting will be called shift patterns). A first one of such shift patterns allows the transmission to be shifted between a certain number, say N, of speed stages, while a second one of such shift patterns allows the transmission to be shifted among a lower number, say N−X, where perhaps X may equal to 1, of speed stages of a gear transmission mechanism incorporated in the transmission. The selection between the shift patterns is made according to the decision of the vehicle operator, via a manually controlled pattern selection switch. Typically, one such pattern may emphasize high engine output power operational characteristics, while the other such pattern may emphasize fuel economy. In any case, it should be understood that this concept is quite distinct from, and can in fact coexist alongside and independently of, the per se conventional concept of providing various shift ranges for the transmission such as "D" range, "S" range, "L" range, and so on; typically the speed stages (in number X) which are omitted from the above identified second one of such shift patterns by comparison with the first one are intermediate speed stages. For example, the first one of such shift patterns may have the vehicle transmission shifting between first, second, third, fourth, and fifth speed stages of its gear transmission mechanism, whereas the second one of such shift patterns may have the vehicle transmission shifting only between said first, third, fourth, and fifth speed stages of its said gear transmission mechanism, thus skipping over the second speed stage of said gear transmission mechanism.

SUMMARY OF THE INVENTION

However, this type of double shifting pattern operation has the following requirements which will now be outlined and which have not been addressed by the prior art. For the present discussion, suppose that it is the (i+1)th speed stage which is omitted in the second shift pattern described above. In the above described context, suppose that it is the first shift pattern which is the one for emphasizing vehicle engine output power, while it is the second shift pattern which is the one for emphasizing vehicle fuel economy. In such a case, in the second shift pattern, for upshifting, the i-th speed stage (maybe, for example, the first speed state) is to be extended to a higher vehicle speed as compared with the first shift pattern, and also part of the (i+2)th speed stage in the first shift pattern (e.g., exemplarily, the third speed stage) is made into the (i+1)th speed stage (e.g., exemplarily, the second speed stage) in the second shift pattern. Thus, the shift up speed at which the transmission is shifted from the i-th speed stage to the (i+1)th speed stage, which is present in the first shift pattern only, is set to be a higher vehicle speed, for the same engine power output, than the shift up speed at which the transmission is shifted from the i-th speed stage to the (i+2)th speed stage in the second shift pattern. In other words, the i-th speed stage is extended to a higher vehicle speed regime in the first shift pattern as compared with the second shift pattern. On the other hand, suppose that it is the first shift pattern which is the one for emphasizing vehicle fuel economy, while it is the second shift pattern which is the one for emphasizing vehicle engine output power. In such a case, in the second shift pattern, for upshifting, the i-th speed stage (maybe, for example, the first speed stage) is to be extended to a higher vehicle speed as compared with the first shift pattern, and substantially all of the (i+2)th speed state in the first shift pattern (e.g., exemplarily, the third speed stage) is made into the (i+1)th speed stage (e.g., exemplarily, the second speed stage) in the second shift pattern. Thus, the shift up speed at which the transmission is shifted from the i-th speed stage to the (i-1)th speed stage, which is present in the first shift pattern only, is set to be approximately the same vehicle speed, for the same engine power output, as the shift up speed at which the transmission is shifted from the i-th speed stage to the (i+2)th speed stage in the second shift pattern. In other words, the i-th speed stage is not substantially extended towards any higher vehicle speed regime in the first shift pattern, as compared with the second shift pattern.

However, the vehicle speed, in the case of the first shift pattern which the next speed stage above the i-th speed stage is the (i+1)th speed stage, at which the engine output power obtained in the i-th speed stage becomes lower than the engine output power obtained in the (i+1)th speed stage which is shifted up to therefrom, is lower than the vehicle speed, in the case of the second shift pattern when the next speed stage above the i-th speed stage is the (i+2)th speed stage, at which the engine output power obtained in the i-th speed stage becomes lower than the engine output power obtained in the (i+2)th speed stage which is shifted up to therefrom. Therefore, in order to obtain suitably high engine output power characteristics with these combinations of engagement of speed stages, based upon these vehicle speed-engine output power characteristics, the shift up vehicle speed from the i-th speed stage to the (i+1)th speed stage must be set lower than the shift up vehicle speed from the i-th speed stage to the (i+2)th speed stage. The inventors of the present invention have considered these various considerations.

Accordingly, it is the primary object of the present invention to provide a method for controlling an automatic transmission, which can control said transmission in either of two shift patterns, one of said shift patterns including one or more speed stages which the other of said shift pattern lacks, which copes with the requirements detailed above.

It is a further object of the present invention to provide such a two shift pattern type method for controlling an automatic transmission, which determines the shift up vehicle road speeds based upon the above considerations.

It is a yet further object of the present invention to provide such a two shift pattern type method for controlling an automatic transmission, which has a well orchestrated mode of providing high engine output power characteristics.

It is a yet further object of the present invention to provide such a two shift pattern type method for controlling an automatic transmission, which has a well orchestrated mode of providing high fuel economy characteristics.

It is an even yet further object of the present invention to provide a two shift pattern type device for controlling an automatic transmission, which aids in and provides implementation of the above identified method objects.

According to the most general method aspect of the present invention, these and other objects are attained by a method for controlling a vehicle automatic transmission which can be set to any one of an ordered set of N contiguous speed stages having monotonically increasing gearing ratios from an Xth speed stage to a (X'N−1)th speed stage, wherein, according to the current values of vehicle operational parameters including vehicle road speed, a parameter representing engine load, and the current setting of a means for setting shift pattern: (a) if a first shift pattern is set on said shift pattern setting means: all said N contiguous speed stages of said transmission are switched between in order of gearing ratio, speed stage shifts occurring from any one of said speed stages only to the next higher speed stage of such exists or to the next lower speed stage if such exits; and: (b) if a second shift pattern is set on said shift pattern setting means: a subject of said N contiguous speed stages of said transmission, excluding the Ith speed stage thereof where I is greater than $(X+N-1)$, are switched between in order of gearing ratio, speed stage shifts occurring from any one of said subset of speed stages only to the next higher speed stage in said subset if such exists or to the next lower speed stage in said subset if such exists; (c) and wherein, for similar values of said parameter representing engine load and of other vehicle operational parameters: if said first shift pattern is set on said shift pattern setting means, the threshold speed at which said transmission is shifted from its $(I-1)$th speed stage to its Ith speed stage is substantially less than the threshold speed at which said transmission is shifted from its $(I-1)$th speed stage to its $(I+1)$th speed stage if said second shift pattern is set on said shift pattern setting means. Optionally but desirably, for similar values of said parameter representing engine load and of other vehicle oerational parameters, if said second shift pattern is set on said shift pattern setting means, the threshold speed at which said transmission is shifted from its $(I-1)$th speed stage to its $(I+1)$th speed stage is substantially less than the threshold speed at which said transmission is shifted from its Ith speed stage to its $(I+1)$th speed stage if said first shift pattern is set on said shift pattern setting means. On the other hand, according to the most general aspect of the present invention, these and other objects are attained by a device for controlling a vehicle automatic transmission which can be set to any one of an ordered set of N contiguous speed stages having monotonically increasing gearing ratios from an Xth speed stage to an $(X+N-1)$th speed stage, comprising: (p) a means for setting shift pattern; and: (q) a means which controls said transmission, according to a signal received from said shift pattern setting means and according to the current values of vehicle operational parameters including vehicle road speed and a parameter representing engine load, so that: (a) if a first shift pattern is set on said shift pattern setting means: all said N contiguous speed stages of said transmission are switched between in order of gearing ratio, speed stage shifts occurring from any one of said speed stages only to the next higher speed stage if such exists or to the next lower speed stage if such exists; and: (b) if a second shift pattern is set on said shift pattern setting means: a subset of said N contiguous speed stages of said transmission, excluding the Ith speed stage thereof where I is greater than X and less than $(X+N-1)$, are switched between in order of gearing ratio, speed stage shifts occurring from any one of said subset of speed states only to the next higher speed stage in said subset if such exists or to the next lower speed stage in said subset if such exists; (c) and wherein, for similar values of said parameter representing engine load and of other vehicle operational parameters: if said first pattern is set on said shift pattern setting means, the threshold speed at which said transmission is shifted from its $(I-1)$th speed stage to its Ith speed stage is substantially less than the threshold speed at which said transmission is shifted from its $(I-1)$th speed stage to its $(I+1)$th speed stage if said second shift pattern is set on said shift pattern setting means. Optionally but desirably said transmission control means, for similar values of said parameter representing engine load and of other vehicle operational parameters, if said second shift pattern is set on said shift pattern setting means, shifts said transmission from its $(I-1)$th speed stage to its $(I+1)$th speed stage at a threshold speed which is substantially less than the threshold speed at which it shifts said transmission fluid its Ith speed stage to its $(I+1)$th speed stage if said first shift pattern is set on said shift pattern setting means.

According to such a method and such a device as specified above, both when said first shift pattern is set on said shift pattern setting means, and when said second shift pattern is set on said shift pattern setting means, high power is obtained without wast for all speed stages of the transmission that are engaged in turn; and, when frequent speed changes are not required, the second shift pattern can be selected on the shift pattern setting means.

BRIEF DESCRIPTION OF THE DRAWINGS

The present invention will now be described with respect to the preferred embodiments of the method and the device thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures; and:

DESCRIPTION OF THE PREFERRED EMBODIMENTS

The present invention will now be described with reference to the preferred embodiments of the method and of the device thereof, and with reference to the figures. Referring first to the schematic skeleton diagram shown in FIG. 1, a transmission therein designated by the reference numeral 1 is shown as being powered by an internal combustion engine 100 via a power transfer shaft 101, and as transmitting output rotational power to a shift 8 which transmits said rotational power to the driver wheels of an automobile (not particularly shown) to which this transmission and engine are fitted. This transmission 1 is suitable for being controlled by the preferred embodiment of the automatic transmission control device of the present invention which will be described hereinafter, according to the preferred embodiment of the automatic transmission control method of the present invention. However, first the overall construction and operation of this transmission 1 will be described. Said transmission 1 comprises a fluid torque converter assembly 2 and a gear transmission mechanism 7. The fluid torque converter assembly 2 is supplied with rotational power via the power output shaft 101 by the internal combustion engine 100, and outputs rotational power to a shaft 9, which functions as a power output shaft for said torque convert assembly 2 and also as a power input shaft for the gear transmission mechanism 7.

Figure 1:
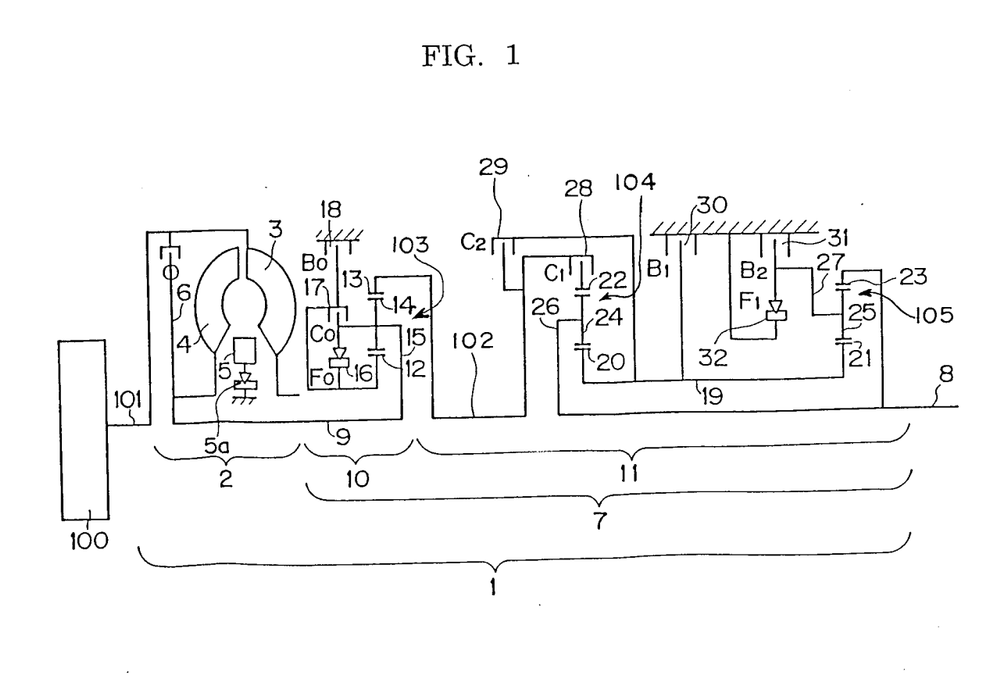
FIG. 1 is a schematic skeleton diagram showing the internal construction of an automatic transmission of a type suitable to be controlled by the preferred embodiment of the automatic transmission control device of the present invention, according to the preferred embodiment of the automatic transmission control method of the present invention.

The fluid torque converter assembly 2 is of a per se conventional three element single stage type, and comprises a pump impeller 3 rotationally connected to the power output shaft 101 of the internal combustion engine 1, a turbine member 4 rotationally connected to the power output shaft 9, and a stator member 5 mounted on a one way clutch 5a to the casing of the fluid torque converter, and further incorporates a lock up clutch 6 which selectively directly connects together in the rotational sense the pump impeller 3 and the turbine member 4. This fluid torque converter functions, when filled with transmission fluid during transmission operation by a pump means not particularly shown, in a generally per se conventional manner to transmit torque from its rotational power input member, i.e. the shaft 101, to its rotational power output member, i.e. the shaft 9, with a certain amount of slippage and also of torque amplification being provided therebetween, by the circulation of said transmission fluid around a toroidal space defined between the pump impeller 3, the turbine member 4, and the stator member 5, in the general circulation pattern of a smoke ring. And the lock up clucth 6, when selectively engaged, locks together said power input shaft 101 and said power output shaft 9, thus preventing slippage and also torque amplification between them.

The gear transmission mechanism 7 comprises an auxiliary gear transmission mechanism 10 and a main gear transmission mechanism 11. The auxiliary gear transmission mechanism 10 is provided with input rotational power from the power output shaft 9 of the fluid torque converter assembly 2, and outputs rotational power via a shaft 102, which functions as a power output shaft for said auxiliary gear transmission mechanism 10 and also as a power input shaft for the main gear transmission mechanism 11, and transmits rotational power therebetween.

The auxiliary gear transmission mechanism 10 is of the same general type as the per se known overdrive device typically included in a conventional type of four speed automatic transmission with overdrive attached, and comprises a first planetary gear mechanism 103 which itself comprises a sun gear 12, a ring gear 13 provided coaxially with said sun gear 12, and a similarly coaxial carrier 15 on which are rotatably mounted a plurality of planetary pinions 14, each of which is meshed between said sun gear 12 and said ring gear 13 and performs planetary movement between said sun gear 12 and said ring gear 13 in a per se conventional manner. The carrier 15 is rotationally connected to the power input shaft 9 of the auxiliary gear transmission mechanism 10, while the ring gear 13 is rotationally connected to the power output shaft 102 of said auxiliary gear transmission mechanism 10. And there is provided a one way clutch F0 16 between the carrier 15 and the sun gear 12, said one way clutch F0 16 always rotationally connecting together said carrier 15 and said sun gear 12 with respect to mutual rotational movement in one relative rotational direction only. A selectively engagable clutch C0 17 is also provided between said carrier 15 and said sun gear 12, said clutch C0 17, when thus selectively engaged, selectively rotationally connecting together said carrier 15 and said sun gear 12 with respect to mutual rotational movement in both relative rotational directions. And a selectively engagable brake B0 18 is also provided between said sun gear 12 and the casing of this auxiliary gear transmission mechanism 10, said brake B0 18, when thus selectively engaged, selectively rotationally connecting together said sun gear 12 and said casting of said auxiliary gear transmission mechanism 10 with respect to mutual rotational movement in both relative rotational directions, i.e. selectively stopping the rotation of said sun gear 12. By selectively engagement and disengagement of one or the other (but never both or neither) of said clutch C0 17 and said brake B0 18, the auxiliary gear transmission mechanism 10 is controlled to provide one or the other of two gearing ratios or rotational speed stages between its power input shaft 9 and its power output shaft 102: a directly connected speed stage, when the clutch C0 17 is engaged and the brake B0 18 is released, in which operational condition the power input shaft 9 and its power output shaft 102 are directly rotationally connected together with no gearing system being interposed therebetween; and a speed increasing or overdrive speed stage, when the clutch C0 17 is released and the brake B0 18 is engaged, in which operational condition the power output shaft 102 rotates at a higher rotational speed than the power input shaft 9. The details will be clear to one of ordinary skill in the transmission art, based upon the descriptions herein.

The main gear transmission mechanism 11 comprises a second planetary gear mechanism 104 and a third planetary gear mechanism 105, both of these planetary gear mechanisms being provided coaxially on the outside of a hollow intermediate shaft 19 which is coaxially fitted over the aforementioned power output shaft 8 of the main gear transmission mechanism 11.

The second planetary gear mechanism 104 comprises a sun gear 20, a ring gear 22 provided coaxially with said sun gear 20, and a similarly coaxial carrier 26 on which are rotatably mounted a plurality of planetary pinions 24, each of which is meshed between said sun gear 20 and said ring gear 22 and performs planetary movement between said sun gear 20 and said ring gear 22 in a per se conventional manner. The sun gear 20 is rotationally fixed on the left end in the figure (the engine side end) of the aforementioned hollow intermediate shaft 19 of this main gear transmission mechanism 11, while the carrier 26 is rotationally connected to the power output shaft 8 of said main gear transmission mechanism 11 which passes through said hollow intermediate shaft 19. And there is provided a selectively engagable clutch C1 28 between the ring gear 22 and the power output shaft 102 of the auxiliary gear transmission mechanism 10 which may also be considered as the power input shaft 102 of this main gear transmission mechanism 11, said selectively engagable clutch C1 28, when thus selectively engaged, selectively rotationally connecting together said ring gear 22 and said power input shaft 102 with respect to mutual rotational movement in both relative rotational directions. A selectively engagable clutch C2 29 is also provided between said power input shaft 102 and said hollow intermediate shaft 19, said clutch C2 29, when thus selectively engaged, selectively rotationally connecting together said power input shaft 102 and said hollow intermediate shaft 19 with respect to mutual rotational movement in both relative rotational directions. By selective engagement and disengagement of said clutches C1 28 and C2 29, this second planetary gear mechanism 104 is controlled to be in various operational conditions, the details of which will be clear to one of ordinary skill in the transmission art, based upon the descriptions herein as will become clear later.

Similarly, the third planetary gear mechanism 105 comprises a sun gear 21, a ring gear 23 provided coaxially with said sun gear 21, and a similarly coaxial carrier 27 on which are rotatably mounted a plurality of planetary pinions 25, each of which is meshed between said sun gear 21 and said ring gear 23 and performs planetary movement between said sun gear 21 and said ring gear 23 in a per se conventional manner. The sun gear 21 is rotationally fixed on the right end in the figure (the end remote from the engine 100) of the aforementioned hollow intermediate shaft 19 of this main gear transmission mechanism 11, while the ring gear 23 is rotationally connected to the power output shaft 8 of said main gear transmission mechanism 11 which passes through said hollow intermediate shaft 19. And there is provided a selectively engagable brake B1 30 between said hollow intermediate shaft 19 and the casing of this main gear transmission mechanism 11, said selectively engagable brake B1 30, when thus selectively engaged, selectively rotationally connecting together said hollow intermediate shaft 19 and said transmission mechanism casing with respect to mutual rotational movement in both relative rotational directions, i.e. stopping the rotation of said hollow intermediate shaft 19. And another selectively engagable brake B2 31 is also provided between said carrier 27 and said casing of this main gear transmission mechanism 11, said brake B2 31, when thus selectively engaged, selectively connecting together said carrier 27 and said transmission mechanism casing with respect to mutual rotational movement in both relative rotational directions, i.e. stopping the rotation of saic carrier 27. Also, via a one way clutch F1 32, the carrier 27 is always rotationally connected to said transmission mechanism casing with respect to mutual rotational movement therebetween in one relative rotational direction only. By selective engagement and disengagement of said brakes B1 30 and B2 31, this third planetary gear mechanism 105 is controlled to be in various operational conditions; again, the details will be clear to one of ordinary skill in the transmission art, based upon the descriptions herein as will become clear shortly.

And thus the main gear transmission mechanism 11 as a whole can be controlled, by the selective engagement and disengagement of the two clutches C1 28 and C2 29 and the two brakes B1 30 and B2 31, to provide any one of three forward gearing ratios or rotational speed stages including a directly connected speed stage, and also one reverse speed stage, between its power input shaft 102 and its power output shaft 8. The details will be clear to one of ordinary skill in the transmission art, based upon the above description. And, thus, the gear transmission 7 as a whole can be controlled, by the combination of the operation of the auxiliary gear transmission mechanism 10 and the main gear transmission mechanism 11 according to the selective engagement and disengagement of the three clutches C0 17, C1 28, and C2 29 and the three brakes B0 18, B1 30, and B2 31 detailed above, to provide any one of six forward gearing ratios or rotational speed stages, including an overdrive speed stage, and also one reverse speed stage, between its power input shaft 9 and its power output shaft 8.

In the Table, which is provided at the end of this specification and before the claims thereof for convenience of pagination, there is shown a particular embodiment of such selective combinations which, however, is selected to provide only five forward gearing ratios or speed stages including an overdrive speed stage. The Table details the particular engagement combinations of the three clutches C0 17, C1 28, and C2 29 and the three brakes B0 18, B1 30, and B2 31 detailed above, which provide each of the said five forward and one reverse speed stages, and also shows the gripping or free running conditions of the two one way clutches F0 16 and F1 32 in each of said speed stages; in more detail, the Table shows all the shift schedules available in each of the shift ranges "P", "R", "N", "D", "S", and "L" available from this transmission. In the Table, an "O" in a column relating to a clutch or a brake shows that said clutch or brake is engaged, while an "X" in such a column relating to a clutch or a brake shows that said clutch or brake is disengaged; and an "O" in a column relating to a one way clutch shows that said one way clutch is engaged so as to transmit rotational power when the engine 100 is powering the driven wheels of the vehicle via the automatic transmission system 1, while a "F" in such a column relating to a one way clutch shows that said one way clutch is free wheeling or is disengaged.

In the particular embodiment detailed in the Table, when the automatic transmission 1 is being operated in its drive or "D" range, all five of its forward speed stages are available to be utilized, according to vehicle operational conditions as will be explained later; when the automatic transmission 1 is being operated in the second or "S" range, no upshifting to the fourth or to the fifth speed stage is ever performed, and only the first through the third speed stages are available to be utilized; and, when the automatic transmission 1 is being operated in the low or "L" range, no upshifting to the third or fourth or the fifth speed stage is ever performed, and only the first and the second speed stages are available to be utilized and to be switched between according to vehicle operational conditions.

With regard to the skeleton transmission diagram shown in FIG. 1 and the schedule of engagement and disengagement of the clutches and brakes shown in the Table, it will be noted that the auxiliary gear transmission mechanism 10 provides its directly connected speed stage when the clutch C0 17 is engaged and the brake B0 18 is released, so as rotationally to connect together the sun gear 12 and the carrier 15; while on the other hand said auxiliary gear transmission mechanism 10 provides its speed increasing speed stage when the clutch C0 17 is released and the brake B0 18 is engaged, so as rotationally to connect together the sun gear 12 and the transmission casing. As will be clear from the appended Table, when the forward clutch C1 28 and the direct clutch C2 29 are both engaged, then the speed stage provided by the main gear transmission mechanism 11 is its highest speed stage which is the directly connected speed stage; while, on the other hand, when only the forward clutch C1 28 is engaged and the one way clutch F1 is automatically engaged and the speed stage provided by the main gear transmission mechanism 11 is its lowest speed stage which is its first speed stage, then the auxiliary gear transmission mechanism 10 switches between its proximately above described direct drive operational condition and its speed increasing operational condition. And, when the forward clutch C1 28 is engaged and also the brake B1 30 is engaged then the speed stage provided by the main gear transmission mechanism 11 is its intermediate speed stage which is its second speed stage, and at this time the auxiliary gear transmission mechanism 10 is fixedly maintained in its proximately above described direct drive operational condition, and is never switched to its speed increasing operational condition. Thus, in addition to the overdrive speed stage which is the fifth speed stage or the highest speed stage, by selective operation of the auxiliary gear transmission mechanism 10 when the main gear transmission mechanism 11 is in its lowest speed stage, another speed stage is newly provided (by contrast to conventional gear transmission mechanisms) between the lowest speed stage of said main gear transmission mechanism 11 and its intermediate speed stage, which is conventionally the second speed stage but in this combination transmission mechanism is newly brought to be the third speed stage. Thereby, a total of five forward speed stages are provided in all. And, in the second speed stage in the "S" range and both the first and the second speed stage in the "L" range, the brake B2 31 is also engaged, so as to rotationally connect the carrier 27 to the casing of the main gear transmission mechanism 11 with respect to mutual rotation therebetween in both rotational directions.

In general, each of the selectably operable three clutches C0 17, C1 28, and C2 29 and three brakes B0 18, B1 30, and B2 31 detailed above is constructed as a per se conventional type of friction engaging mechanism incorporating two sets of mutually interleaved plates and a pressure chamber; and when hydraulic fluid pressure is supplied to said pressure chamber, said two sets of interleaved plates are pressed together and rotationally engage together, thus bringing said friction engaging mechanism to be engaged; while, on the other hand, when no such hydraulic fluid pressure is supplied to said pressure chamber, said two sets of interleaved plates are biased apart by the action of a biasing means such as springs and are rotationally disengaged from one another, thus bringing said friction engaging mechanism to be disengaged.

The lock up clutch 6 incorporated into the fluid torque converter assembly 2, and the clutch C0 17 and the brake B0 18 of the auxiliary gear transmission mechanism 10 as well as the two clutches C1 28 and C2 29 and the two brakes B1 30 and B2 31 of the main gear transmission mechanism 11, are all hydraulically operated to be appropriately engaged or disengaged by a hydraulic control system in the various combinations shown in the Table according to certain shift patterns for each manually controlled transmission operational range, said shift patterns being determined in advance, and being based upon the particular current values of vehicle operational parameters such as in particular vehicle road speed and engine load. Typically, engine throttle opening is taken as a parameter representative of such engine load. This hydraulic control device controls the supplying and the draining of hydraulic fluid to and from said various clutches and brakes, and it in its turn is controlled by an electrical control device which in this preferred embodiment of the present invention incorporates a micro computer. The combination of said hydraulic control device and said electrical control device is comprised in the preferred embodiment of the transmission control device according to the present invention, and performs the preferred method embodiment.

Figure 2:
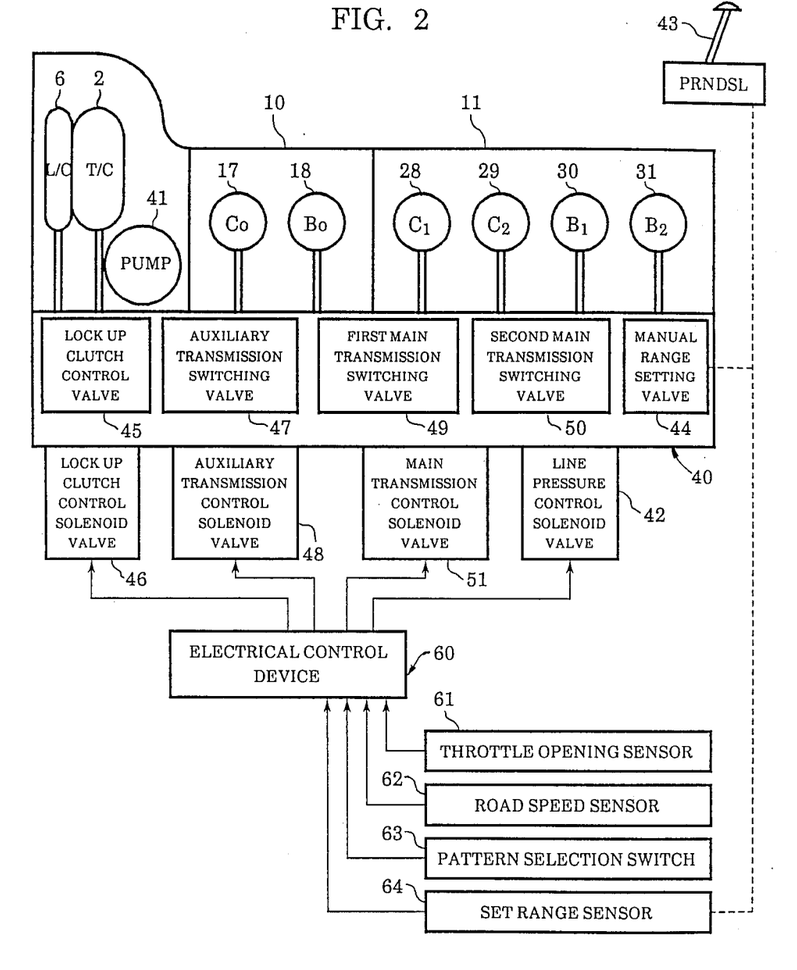
FIG. 2 is a schematic block diagrammatical structural diagram showing the internal construction of said preferred embodiment of the automatic transmission control device of the present invention, for performing said preferred method embodiment.

In FIG. 2, there is shown said hydraulic control device in block diagrammatical view. It comprises the aforesaid hydraulic control device, generally designated by the reference numeral 40, and the aforesaid electrical control device, which is designated by the reference numeral 60.

The hydraulic control device 40 comprises: a hydraulic fluid pump 41, which is rotationally driven by the engine 100, typically in fact from the pump impeller 3 of the fluid torque converter assembly 2; a line pressure control solenoid valve 42, which is an electromagnetic solenoid valve of a per se known type which is supplied from the electrical control device 60 as will be described later with an electrical signal of a certain appropriate duty ratio for the current values of vehicle operational parameters such as engine load and so on, and which according to said duty ratio regulates the value of the line hydraulic fluid pressure supplied to and present in various line pressure conduits of the hydraulic control device 40; a manual range setting valve 44, which is operated by being connected to a manual range control lever 43 which is manually shiftable by the driver of the vehicle to any one of various positions indicating the one of the various shifts ranges "P", "R", "N", "D", "S", or "L" of the vehicle in which said driver wishes to operate the vehicle; a lock up clutch control valve 45 which regulates the value of the hydraulic fluid pressure supplied to the lock up clutch 6 of the fluid torque control assembly 2, thus either to engage or to release said lock up clutch 6; a lock up clutch control solenoid valve 46, which also is an electromagnetic solenoid valve of a per se known type which is supplied from the electrical control device 60 as will also be described later with an electrical signal, and which according to said electrical signal controls the switching of the lock up clutch control valve 45; an auxiliary gear transmission mechanism switching valve 47, which selectively supplies hydraulic fluid pressure to one or the other of the overdrive clutch C0 17 and the overdrive brake B0 18 of the auxiliary gear transmission mechanism 10 and thus switches over the engaged speed stage of said auxiliary gear transmission mechanism 10 to an appropriate speed stage; an auxiliary gear transmission control solenoid valve 48, which also is an electromagnetic solenoid valve of a per se known type which is supplied from the electrical control device 60 as will also be described later with an electrical signal, and which according to said electrical signal controls the switching of the auxiliary gear transmission mechanism switching valve 47; a first main gear transmission mechanism switching valve 49 and a second main gear transmission mechanism switching valve 50, which together control the selective supplies of control hydraulic fluid pressures to the forward clutch C1 28 and the direct clutch C2 29 and the shift brakes B1 30 and B2 31 detailed above of the main gear transmission mechanism 11, thereby to set said main gear transmission mechanism 11 to an appropriate one of its speed stages; and a main gear transmission control solenoid valve 51, which also is an electromagnetic solenoid valve of a per se known type which is supplied from the electrical control device 60 as will also be described later with an electrical signal of a certain duty ratio, and which according to said electrical signal controls the switching over of the first and second main gear transmission mechanism switching valves 49 and 60.

In more detail should such be required, the auxiliary gear transmission mechanism switching valve 47 is constructed as a spool valve comprising a valve element (not shown) which slides in a bore (not shown either), and is adapted for said valve element to be switched to one end or the other of said bore according as to whether a control pressure is or is not supplied to a pressure chamber located at one end of said bore; and the supply of this control pressure is controlled in an on/off fashion by the auxiliary gear transmission control solenoid valve 48, according to an on/off signal which said auxiliary gear transmission control solenoid valve 48 receives from the electrical control device 60. For example it may be so arranged that, when said auxiliary gear transmission control solenoid valve 48 receives an on electrical signal from the electrical control device 60, then it provides said control pressure to said pressure chamber of said auxiliary gear transmission mechanism switching valve 48, thereby to switch the valve element thereof so as to cause said auxiliary gear transmission mechanism switching valve 47 to be switched to its overdrive speed stage position, wherein it supplies such an appropriate combination of hydraulic fluid pressures to the overdrive clutch C0 17 and the overdrive brake B0 18 of the auxiliary gear transmission mechanism 10 as to switch over the engaged speed stage of said auxiliary gear transmission mechanism 10 to the overdrive speed stage; whereas, on the other hand, when said auxiliary gear transmission control solenoid valve 48 receives an off electrical signal from the electrical control device 60, then it provides no such control pressure to said pressure chamber of said auxiliary gear transmission mechanism switching valve 47 and instead drains said pressure chamber, thereby to switch the valve element of said auxiliary transmission mechanism switching valve 47 so as to cause said valve 47 to be switched to its directly connected speed stage position, wherein it supplies such an appropriate combination of hydraulic fluid pressures to the overdrive clutch C0 17 and the overdrive brake B0 18 of the auxiliary gear transmission mechanism 10 as to switch over the engaged speed stage of said auxiliary gear transmission mechanism 10 to the directly connected speed stage. On the other hand, both the first main gear transmission mechanism switching valve 49 and also the second main gear transmission mechanism switching valve 50 are constructed as spool valves each comprising a valve element (not shown) which slides in a bore (not shown either), and each of them is, by contrast to said auxiliary gear transmission mechanism switching valve 47, adapted for its said valve element to be switched to one end or the other of its said bore according as to whether a control pressure greater than a certain particular determinate threshold pressure value (peculiar to said particular valve 49 or 50) is or is not supplied to a pressure chamber located at one end of its said bore. The supply of a hydraulic fluid pressure, which serves as this control pressure for both the first and second main gear transmission mechanism switching valves 49 and 50, is controlled in a generally continuous fashion by the main gear transmission mechanism control solenoid valve 51, according to the duty ratio of a pulse signal which said main gear transmission control solenoid valve 51 receives from the electrical control device 60. For example it may be so arranged that, when said first main gear transmission mechanism switching valve 49 receives a pressure value greater than a first threshold pressure value P1 which is supplied from said main gear transmission control solenoid valve 51 when it receives an electrical signal from the electrical control device 60 with duty ratio greater than a first threshold duty ratio value R1, then the valve element of said first main gear transmission mechanism switching valve 49 is switched over; whereas, on the other hand, when said second main gear transmission mechanism switching valve 50 receives a pressure value greater than a second threshold pressure value P2, higher than said first threshold value P1, which is supplied from said main gear transmission control solenoid valve 51 when it receives an electrical signal from the electrical control device 60 with duty ratio greater than a second threshold duty ratio valve R2 which is higher than said first threshold duty ratio value R1, then the valve element of said second main gear transmission mechanism switching valve 50 is switched over. Accordingly, therefore, as to whether the main gear transmission control solenoid valve 51 receives an electrical signal from the electrical control device 60 with duty ratio less than said first threshold duty ratio value R1 and also less than said second threshold duty ratio value R2, or greater than said first threshold duty ratio value R1 but still less than said second threshold duty ratio value R2, or greater than said first threshold duty ratio value R1 and also greater than said second threshold duty ratio value R2, said main gear transmission mechanism 11 is switched to one or the other of its three forward speed stages. Such a system of speed change valves and such a control device are disclosed in Japanese Utility Model Application Serial No. Sho. 55-26596 (1980), which has been published as Japanese Utility Model Laying Open Publication Serial No. Sho. 58-38186 (1983); in Japanese Patent Application Ser. No. Sho. 55-107260 (1980), which has been published as Japanese Patent Laying Open Publications Serial No. Sho. 56-24246 (1981); and in the specification of U.S. Pat. No. 4,252,148, and, should a more detailed description thereof be deemed necessary, reference should be made to the above identified publications.

The electrical control device 60, which typically is a micro computer, receives input signals from a variety of sensors which sense the current values of various operational parameters of the vehicle including its engine 100, including: a throttle opening sensor 61, which senses the position of a throttle valve (not particularly shown) of the internal combustion engine 100, and which produces an output electrical signal representative thereof, said throttle position being taken as being representative of load upon said internal combustion engine 100 (but the amount of accelerator pedal depression, or the torque on the power output shaft 101 of said engine 100, could alternatively be utilized instead); a vehicle road speed sensor 62, which senses the value of a parameter representative of vehicle road speed (such as the rotational speed of the power output shaft 8 of the transmission), and which produces an output electrical signal representative thereof; a shift pattern selection switch 62 which is manually operated by the driver of the vehicle to select one or the other of various shift patterns available (two in the presently described preferred embodiment, as will be particularly explained shortly since it is crucial to the concept of the present invention); and a set range sensor 64, which senses to which of its positions the manual range control lever 43 has currently been manually shifted by the driver of the vehicle, in order to operate said vehicle in the desired one of the available shift ranges "P", "R", "N", "D", "S", and "L", and which produces an output electrical signal representative thereof. And, based upon said input signals and optionally others, said electrical control device 60 outputs appropriate on/off signals to the lock up clutch control solenoid valve 46 and the auxiliary gear transmission control solenoid valve 48, to control the lock up clutch 6 and the auxiliary gear transmission mechanism 10 as explained above, and outputs electrical pulse signals of appropriate duty ratios to the line pressure control solenoid valve 42 and to the main gear transmission control solenoid valve 51, to control the line pressure for the transmission and to control the main gear transmission mechanism 11 as also explained above. And the electrical control device 60 has, prestored in it, speed change patterns including a first speed change pattern and a second speed change pattern, which determine the characteristics of such shifting operation.

Now, the actual intimate details of the manner in which the electrical control device 60 performs its functions, which in the preferred case that said electrical control device 60 incorporates a micro computer would include programs stored in its ROM and flow charts for said programs, will not particularly be described in this specification, because based upon the disclosure herein of the function of said electrical control device 60 various possible ways of implementing said function will be easily conceived of by one of ordinary skill in the relevant art without undue experimentation. Therefore, the discussions and disclosures in the remainder of this specification will be purely functional in nature, because implementation details can be relatively easily supplemented.

Figure 3:
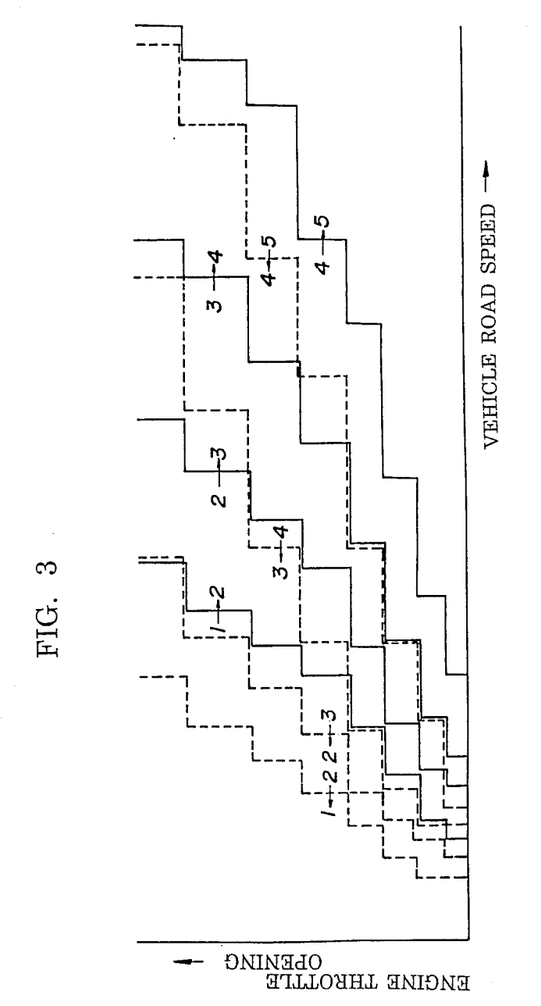
FIG. 3 is a first shift pattern diagram utilized in a first vehicle operational mode, showing transition lines between various transmission speeds defined in a plane space shown by vehicle road speed on the horizontal axis and engine throttle opening on the vertical axis, said shift pattern diagram showing shifting between all of five speed stages of the transmission of FIGS. 1 and 2.
Figure 4:
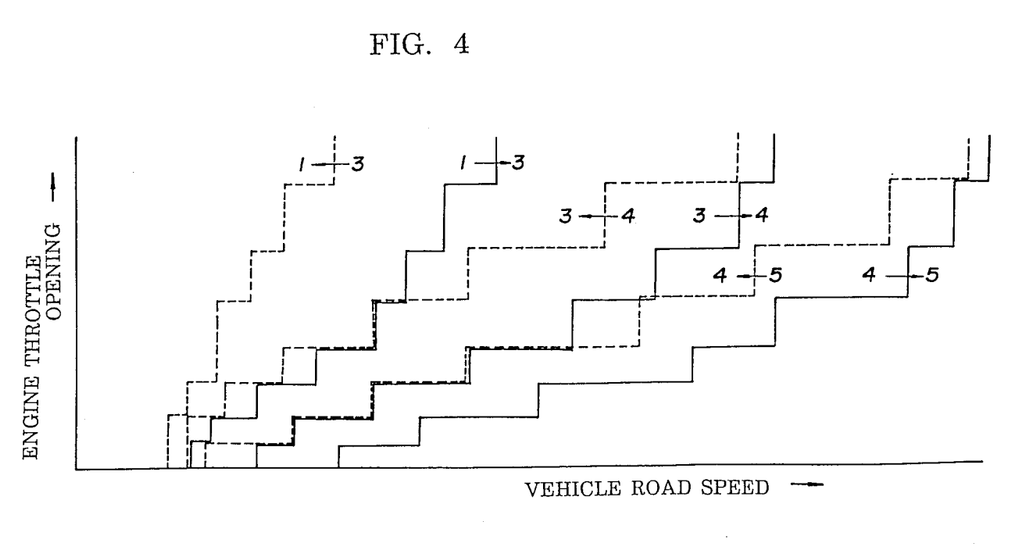
FIG. 4 is a second shift pattern diagram utilized in a second vehicle operational mode, also showing transition lines between various transmission speeds defined in a phase space shown by vehicle road speed on the horizontal axis and engine throttle opening on the vertical axis, said shift pattern diagram showing shifting between only four to said five speed stages of the transmission of FIGS. 1 and 2.

Referring then to FIGS. 3 and 4, in this preferred embodiment, there are two possible shift patterns for the transmission mechanism as a whole, which may be manually selected between by the driver of the vehicle on the shift pattern selection switch 62, which is mounted in the driving compartment of the vehicle. A first such shift pattern is as shown in the shift pattern diagram of FIG. 3, which shows the transition lines between the various transmission speeds defined in a phase space shown in said figure by vehicle road speed (on the horizontal axis) and engine throttle opening (on the vertical axis). In this first shift pattern, all five of the speed stages of the transmission, described above and shown in the Table, are available; thus there are present in FIG. 3 a 1-2 upshift line, a 2-1 downshift line, a 2-3 upshift line, and a 3-2 downshift line, but there are present no direct 1-3 upshift line or direct 3-1 downshift line, since these direct up and down shifts are never performed in this first shift pattern. By contrast, a second such shift pattern is as shown in the shift pattern diagram of FIG. 4, which again shows the transition lines between the various transmission speeds defined in a phase space shown in said figure by vehicle road speed (on the horizontal axis) and engine throttle opening (on the vertical axis). In this second shift pattern, only four of the five of the speed stages of the transmission, described above and shown in the Table, are available; thus there are present in FIG. 3 a direct 1-3 upshift line and a direct 3-1 downshift line, but there are present no 1-2 upshift line, 2-1 downshift line, 2-3 upshift line, or 3-2 downshift line, since the second speed stage is never engaged in this second shift pattern.

Thus, denoting the number of speed stages of the shown exemplary but preferred transmission, which is five, as "N" (so N=5), and the speed stage which is omitted in the second of these shift pattern diagrams by comparison with the first of these shift pattern diagrams, which is the second speed stage, as the "I"th speed stage (so I=2), then the first shift pattern shown in FIG. 3 has N speed stages, and the second shift pattern shown in FIG. 4 has N−1 speed stages with the Ith speed stage being skipped over. Thus, the first shift pattern shown in FIG. 3 has shift up lines from the nth speed stage to the (n+1)th speed stage, for all values of n from 1 to (N−1) (which is four in this exemplary case), and also has shift down lines from the (n+1)th speed stage to the nth speed stage, for all values of n from (N−1) to 1; while the second shift pattern shown in FIG. 4 has shift up lines from the nth speed stage to the (n+1)th speed stage, for all values of n from 1 to (N−1) except for the values of n equal to (I−1) and I, for which instead said FIG. 4 shift pattern only has a shift up line from the (I−1)th speed stage to the (I+1)th speed stage, and also has shift down lines from the (n+1)th speed stage to the nth speed stage, for all values of n from (N−1) to 1 except for said values of n equal to I and (I−1), for which instead said FIG. 4 shift pattern only has a shift down line from the (I+1)th speed stage to the (I−1)th speed stage.

Particularly according to the concept of the present invention, for the same value of engine throttle opening (i.e. engine load), the vehicle speed for the 1-2 shift up in the first shift pattern of FIG. 3 is set to be lower than the vehicle speed for the 1-3 shift up in the second shift pattern of FIG. 4. Also, again for the same value of engine throttle opening, said vehicle speed for said 1-3 shift up in said second shift pattern of FIG. 4 is set to be lower than the vehicle speed for the 2-3 shift up in said first shift pattern of FIG. 3. In other words, in the more general nomenclature of the preceding paragraph, the vehicle speed for the (I−1)-I shift up in the first shift pattern including all N speed stages is set to be lower than the vehicle speed for the (I−1)-(I+1) shift up in the second shift pattern in which the Ith speed stage is excluded. Also, again for the same value of engine throttle opening, said vehicle speed for said (I−1)-(I+1) shift up in said second shift pattern in which the Ith speed stage is excluded is set to be lower than the vehicle speed for the I-(I+1) shift up in the first shift pattern including all N speed stages.

Figure 5:
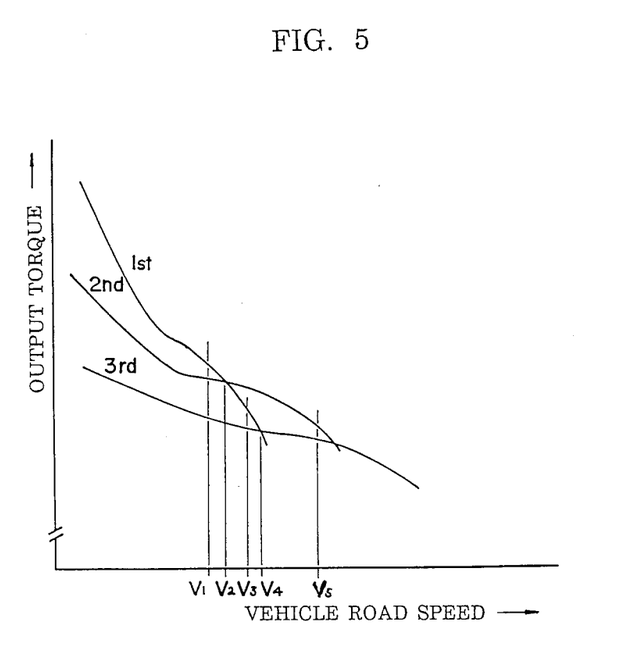
FIG. 5 is a graph showing vehicle road speed on the horizontal axis against output torque on the vertical axis, for various ones of the speed stages of the transmission of FIGS. 1 and 2.

In FIG. 5, there is shown a graph of vehicle road speed (shown along the horizontal axis) against output torque (shown along the vertical axis), for various ones of the speed stages of this preferred transmission, including the speed stage (the second speed stage, or the Ith speed stage) which is excluded in the second above described shift pattern, and the speed stage (the third speed stage, or the (I+1)th speed stage) or higher than said excluded speed stage and the speed stage (the first speed stage, or the (I−1)th speed stage) one below said excluded speed stage. In this graph V4 denotes the speed at which the lines for output torque against vehicle road speed for the first and the third speed stage intersect, whereas V2 denotes the speed at which the lines for output torque against vehicle road speed for the first and the second speed stage intersect. From this graph it is seen that the proper speed to upshift directly in the speed shift diagram of FIG. 4 from the first speed stage to the third speed stage, bypassing the second speed stage, without deteriorating output power, will be a speed such as V3, i.e. a slightly lower speed than the speed V4. On the other hand, if the speed to upshift in the speed shift diagram of FIG. 3 from the first speed stage to the second speed stage were similarly set to be V3, since this speed V3 is definitely higher than the speed V2 at which the lines for output torque against vehicle road speed for the first and the second speed stage intersect, therefore in the region above V2 and below V3 the torque thus obtained in the first speed stage would be less than that obtained in the secodn speed stage; so that this upshift speed V3 is demonstrated to be the wrong upshift speed. In fact, it is most desirable that the speed to upshift in the speed shift diagram of FIG. 3 from the first speed stage to the second speed stage should be set to be a speed such as V1, i.e. a slightly lower speed than the speed V2. Thus, in order to ensure appropriate speed-torque characteristics, the vehicle speed for the 1-2 shift up in the first shift pattern of FIG. 3 is set to be lower than the vehicle speed for the 1-3 shift up in the second shift pattern of FIG. 4, for the same engine power output. Also, according to the same type of argument, the vehicle speed for said 1-3 shift up in the second shift pattern of FIG. 4 is set to be lower than the vehicle speed (V5) for the 2-3 shift up in the first shift pattern of FIG. 3, for the same engine power output. According to these arrangements, therefore, both the first and the second shit pattern are appropriately set so that high output power and smooth driving are available in all changes between the first through the third speed stages, in either operational mode when the shift pattern switch 64 is set to either of its two positions. Accordingly, excellent drivability is obtained.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

TABLE

|  |  | C1 28 | C2 29 | C0 17 | B1 30 | B2 31 | B0 18 | F1 32 | F0 16 |
|---|---|---|---|---|---|---|---|---|---|
| "P" RANGE |  |  | X | X | O | X | X | X | F | F |
| "R" RANGE |  |  | X | O | O | X | O | X | F | O |
| "N" RANGE |  |  | X | X | O | X | X | X | F | F |
| "D" RANGE | 1ST | O | X | O | X | X | X | O | O |
|  | 2ND | O | X | X | X | X | O | O | F |
|  | 3RD | O | X | O | O | X | X | F | O |
|  | 4TH | O | O | O | X | X | X | F | O |
|  | 5TH | O | O | X | X | X | O | F | F |
| "S" RANGE | 1ST | O | X | O | X | X | X | O | O |
|  | 2ND | O | X | X | X | O | O | O | F |
|  | 3RD | O | X | O | O | X | X | F | O |
| "L" RANGE | 1ST | O | X | O | X | O | X | O | O |
|  | 2ND | O | X | X | X | O | O | O | F |

What is claimed is:

1. An automatic transmission for a vehicle driven by an engine, comprising:
   a gear mechanism;
   friction engaging means; and
   a control system for controlling engagement and disengagement of said friction engaging means;

said gear mechanism providing a plurality of speed stages, including a first, a second next to said first and a third next to said second speed stages, according to selective engagement and disengagement of said friction engaging means; and said control system controlling said friction engaging means so as to shift said gear mechanism between said first and second speed stages and between said second and third speed stages according to a first shift pattern of coordination between load on the engine and road speed of the vehicle, and to shift said gear mechanism between said first and third speed stages while skipping said second speed stage according to a second shift pattern of coordination between load on the engine and road speed of the vehicle, wherein a shift line bordering said first speed stage from said second speed stage for upshifting in said first shift pattern is located on a lower vehicle road speed side than a shift line bordering said first speed stage from said third speed stage for upshifting in said second shift pattern.

* * * * *